(12) United States Patent
Park et al.

(10) Patent No.: US 9,760,149 B2
(45) Date of Patent: Sep. 12, 2017

(54) ENHANCED DYNAMIC MEMORY MANAGEMENT WITH INTELLIGENT CURRENT/POWER CONSUMPTION MINIMIZATION

(71) Applicant: QUALCOMM Incorporated, San Diego, CA (US)

(72) Inventors: Hee Jun Park, San Diego, CA (US); Richard Gerard Hofmann, Cary, NC (US); Yong Ju Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 582 days.

(21) Appl. No.: 13/736,268

(22) Filed: Jan. 8, 2013

(65) Prior Publication Data

US 2014/0195837 A1 Jul. 10, 2014

(51) Int. Cl.
*G06F 1/32* (2006.01)
*G06F 13/16* (2006.01)

(52) U.S. Cl.
CPC ......... *G06F 1/3225* (2013.01); *G06F 1/3287* (2013.01); *G06F 13/1668* (2013.01); *Y02B 60/1282* (2013.01)

(58) Field of Classification Search
None
See application file for complete search history.

(56) References Cited

U.S. PATENT DOCUMENTS

| 5,235,548 | A | 8/1993 | Kurkowski |
| 5,248,967 | A * | 9/1993 | Daneshfar ............ 340/931 |
| 7,289,921 | B1 | 10/2007 | Salmi et al. |
| 7,900,018 | B2 | 3/2011 | Kwon et al. |

(Continued)

FOREIGN PATENT DOCUMENTS

| CN | 102694538 A | 9/2012 |
| JP | 2012226786 A | 11/2012 |

(Continued)

OTHER PUBLICATIONS

International Search Report and Written Opinion—PCT/US2014/010546—ISA/EPO—dated May 13, 2014.

(Continued)

*Primary Examiner* — Paul J Yen
(74) *Attorney, Agent, or Firm* — Qualcomm Incorporated

(57) ABSTRACT

A low-power state current/power consumption for each volatile memory device in a plurality of volatile memory devices is obtained. Data is copied from a first set of the volatile memory devices to a second set of the volatile memory devices, where the second set of volatile memory devices has a lower current/power consumption than the first set of volatile memory devices. Additionally, a current/power consumption may be obtained for each memory bank within each of the plurality of volatile memory devices. Data is then copied from a first set of memory banks to a second set of memory banks within the same memory device in the second set of memory devices, where the second set of memory banks has lower current/power consumption than the first set of memory banks. The first set of volatile (Continued)

memory devices and/or first set of memory banks are then placed into a power-down state.

16 Claims, 9 Drawing Sheets

(56) References Cited

U.S. PATENT DOCUMENTS

| | | | |
|---|---|---|---|
| 8,010,317 B1 | 8/2011 | Pennanen et al. | |
| 8,166,326 B2 | 4/2012 | Pagan | |
| 2003/0051104 A1* | 3/2003 | Riedel | G06F 1/3225 711/154 |
| 2006/0230295 A1* | 10/2006 | Schumacher et al. | 713/300 |
| 2007/0252623 A1* | 11/2007 | Zampaglione et al. | 327/74 |
| 2008/0040563 A1 | 2/2008 | Brittain et al. | |
| 2008/0307240 A1 | 12/2008 | Dahan et al. | |
| 2009/0310408 A1* | 12/2009 | Lee | G11C 11/5628 365/185.03 |
| 2010/0165764 A1 | 7/2010 | Petralia et al. | |
| 2011/0068858 A1 | 3/2011 | Chawla et al. | |
| 2011/0093726 A1* | 4/2011 | Worthington | G06F 1/3225 713/320 |
| 2011/0252180 A1 | 10/2011 | Hendry et al. | |
| 2011/0291729 A1 | 12/2011 | Chan et al. | |
| 2011/0296221 A1* | 12/2011 | Gupta | G06F 1/26 713/324 |
| 2012/0072744 A1* | 3/2012 | Jain | G06F 1/3268 713/320 |
| 2012/0144144 A1 | 6/2012 | Worthington et al. | |
| 2013/0111180 A1* | 5/2013 | Wong | 711/173 |

FOREIGN PATENT DOCUMENTS

| | | |
|---|---|---|
| JP | 2013250791 A | 12/2013 |
| JP | 2014081688 A | 5/2014 |
| JP | 2016500186 A | 1/2016 |
| KR | 20080030674 A | 4/2008 |
| KR | 20090115870 A | 11/2009 |
| KR | 20120031971 A | 4/2012 |

OTHER PUBLICATIONS

Loghi, et al., "Architectural Leakage Power Minimization of Scratchpad Memories by Application-Driven Subbanking", IEEE Transactions on Computers, vol. 59, No. 7, Jul. 2010, pp. 891-904.
International Search Report and Written Opinion—PCT/US2013/071436—ISA/EPO—dated May 8, 2014.

* cited by examiner

ENHANCED DYNAMIC MEMORY MANAGEMENT WITH INTELLIGENT CURRENT/POWER CONSUMPTION MINIMIZATION

BACKGROUND

Field

The present disclosure pertains to the reducing or minimizing current/power consumption in memory devices on which dynamic memory management (DMM) is implemented.

Background

FIG. 1 illustrates low-power state current/power consumption variations between memory devices as well as banks therein. In one example, a plurality of volatile memory devices 102, 104, and 106, such are random access memory (RAM) devices (e.g., RAM parts), may be included as part of a larger circuit or electronic device. Each volatile memory device 104 may be arranged as a plurality of memory banks 108, 110, and 112, e.g., within a single silicon die. Due to the nature of the silicon manufacturing process, there may be part-to-part power variations (e.g., device-to-device power variations) and bank-to-bank power variations within each memory device. That is, each volatile memory device may exhibit a different low-power state consumption (e.g., leakage current, dynamic power consumption, etc.), while each memory bank may also exhibit a different low-power state consumption.

Some processing systems seek to implement power management or conservation which may involve reducing power usage of some memory devices when idle. Dynamic Memory Management (DMM) is one such system.

FIG. 2 illustrates a traditional dynamic memory management (DMM) scheme. Here, a processing circuit 202 may be coupled to a plurality of volatile memory devices 204, 206, 208, 210 (e.g., RAM x 32), on dual channels Ch0 and Ch1 (e.g., channel 0 and channel 1). During periods of prolonged idleness (e.g., overnight, in bags, etc.) available volatile memory is dynamically decreased (e.g., shutoff). Memory pages in upper volatile memory devices 204 and 208 are flushed if possible, or otherwise migrated to lower volatile memory devices 206 and 210. Here, it can be perceived that when entering DMM mode, data is migrated from a first plurality of volatile memory devices 204 and 208 on chip select 1 (cs1) to a second plurality of volatile memory devices 206 and 210 on chip select 0 (cs0). Once there are no active memory pages (e.g., block or segment of memory) in the memory devices controlled by chip select cs1 (i.e., upper volatile memory devices 204 and 208), those memory devices 204 and 208 coupled to chip select cs1 are transitioned to a Deep Power-down state to conserve power. However, this approach does not take into account the efficiency (e.g., low-power state current) of the memory devices 204 and 208 being powered-down and/or the memory devices 206 and 210 kept active.

Consequently, a more efficient method of power management for volatile memory devices is needed to further improve on the traditional Dynamic Memory Management approach.

SUMMARY

An electronic device, comprising: a plurality of volatile memory devices and a processing circuit. The processing circuit may be configured to perform dynamic memory management. A low-power state current/power consumption is obtained, computed, or estimated for each volatile memory device in the plurality of volatile memory devices. In one example, a power management device coupled to the processing circuit may be configured to ascertain the low-power state current/power consumption for each of the plurality of volatile memory devices. Data may then be copied or transferred from a first set of the volatile memory devices to a second set of the volatile memory devices, where the second set of volatile memory devices has a lower low-power state current/power consumption than the first set of volatile memory devices. The first set of volatile memory devices may then be placed into a power-down state to reduce power consumption.

Similarly, the second set of volatile memory devices may be placed into a power conservation state to reduce power consumption.

A non-volatile storage device may also be coupled to the processing circuit, where the non-volatile storage device stores the low-power state current/power consumption for each of the plurality of volatile memory devices.

The low-power state may maintain data in the second set of volatile memory devices, while the power-down state causes data in the first set of volatile memory devices to be lost. The power conservation state may maintain data in the second set of volatile memory devices, while the power-down state causes data in the first set of volatile memory devices to be lost.

In one example, the low-power state may be the power conservation state. The low-power state current/power consumption may include leakage current/power consumption and dynamic power consumption.

In one example, the processing circuit may be configured to determine when to switch the first set of volatile memory devices into the power-down state after a period of inactivity.

The plurality of volatile memory devices may be arranged in one or more channels, and the first set and second set of volatile memory devices are determined on a per channel basis. The data may be copied between memory devices in the same channel.

In one example, the low-power state current/power consumption for each of the plurality of volatile memory devices is ascertained during a manufacturing stage or during an initialization stage.

In some implementations, the processing circuit may be further configured to: (a) compensate for temperature variations between the memory devices; and/or (b) normalize the low-power state current/power consumption for each of the plurality of volatile memory devices based on their corresponding temperatures.

According to another aspect, the processing circuit may be further configured to perform dynamic memory management by: (a) obtaining a low-power state current/power consumption for each memory bank within each of the volatile memory devices of the plurality of volatile memory devices; (b) copying data from a first set of memory banks to a second set of memory banks within the same memory device in the second set of memory devices, where the second set of memory banks has lower low-power state current/power consumption than the first set of memory banks; and/or (c) placing the first set of memory banks into a power-down state.

Similarly, a method for performing dynamic memory management is provided. A low-power state current/power consumption is obtained for each volatile memory device in a plurality of volatile memory devices. Then data is copied from a first set of the volatile memory devices to a second set of the volatile memory devices, where the second set of volatile memory devices has a lower low-power state current/power consumption than the first set of volatile memory devices. A determination may be made as to when to switch the first set of volatile memory devices into the power-down state after a period of inactivity. The first set of volatile memory devices may then be placed into a power-down state to reduce power consumption.

The second set of volatile memory devices may be placed into a power conservation state to reduce power consumption.

According to one aspect, a low-power state current/power consumption may be obtained for each memory bank within each of the plurality of volatile memory devices. Data is then copied from a first set of memory banks to a second set of memory banks within the same memory device in the second set of memory devices, where the second set of memory banks has lower low-power state current/power consumption than the first set of memory banks. The first set of memory banks may then be placed into a power-down state.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Overview

A first enhanced dynamic memory management technique is provided in which a mechanism is added to dynamic memory management to determine and use the lowest low-power state current/power consumption (e.g., leakage current/power consumption and/or dynamic consumption) volatile memory devices in each system during a power conservation state. Prior to entering the power conservation state, the current leakage/power characteristics and/or dynamic power consumption characteristics of the memory devices in a system may be ascertained. Then, upon deciding to enter the power conservation state, data is migrated from memory devices with greater current/power consumption (e.g., in a particular channel) to memory devices with lower current/power consumption.

A second enhanced dynamic memory management technique is also provided in which lower current/power consumption memory banks (within active volatile memory devices) are selected for use during dynamic memory management. Prior to entering the power conservation state, the current/power consumption characteristics of each bank in some or all memory devices in a system may be ascertained. Then, upon deciding to enter the power conservation state, one or more memory devices are selected to stay active. Within each of the selected one or more memory devices, data is migrated from one or more banks with greater current/power consumption (e.g., in a particular channel) to one or more banks with lower current/power consumption.

Figure 1:
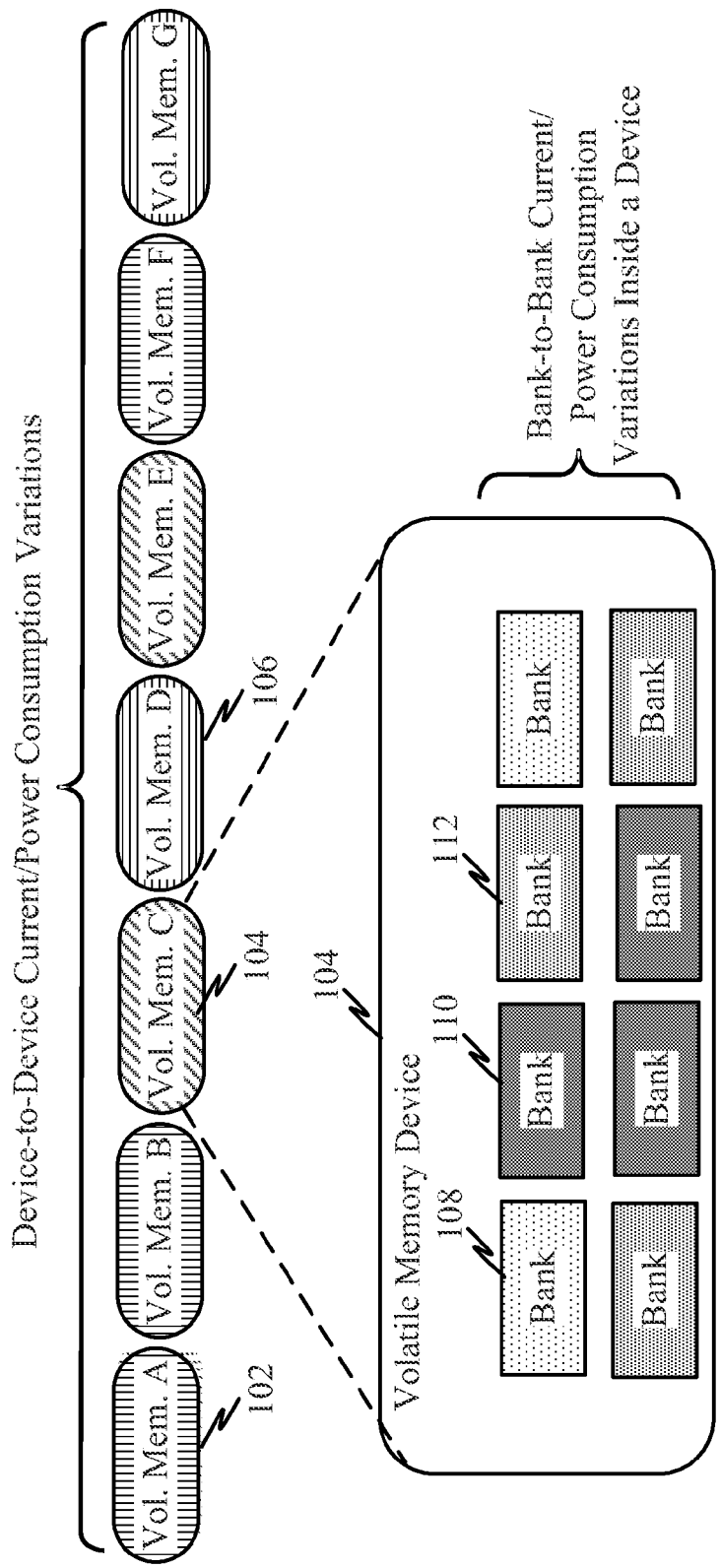
FIG. 1 illustrates low-power state current/power consumption variations between memory devices as well as banks therein.
Figure 2:
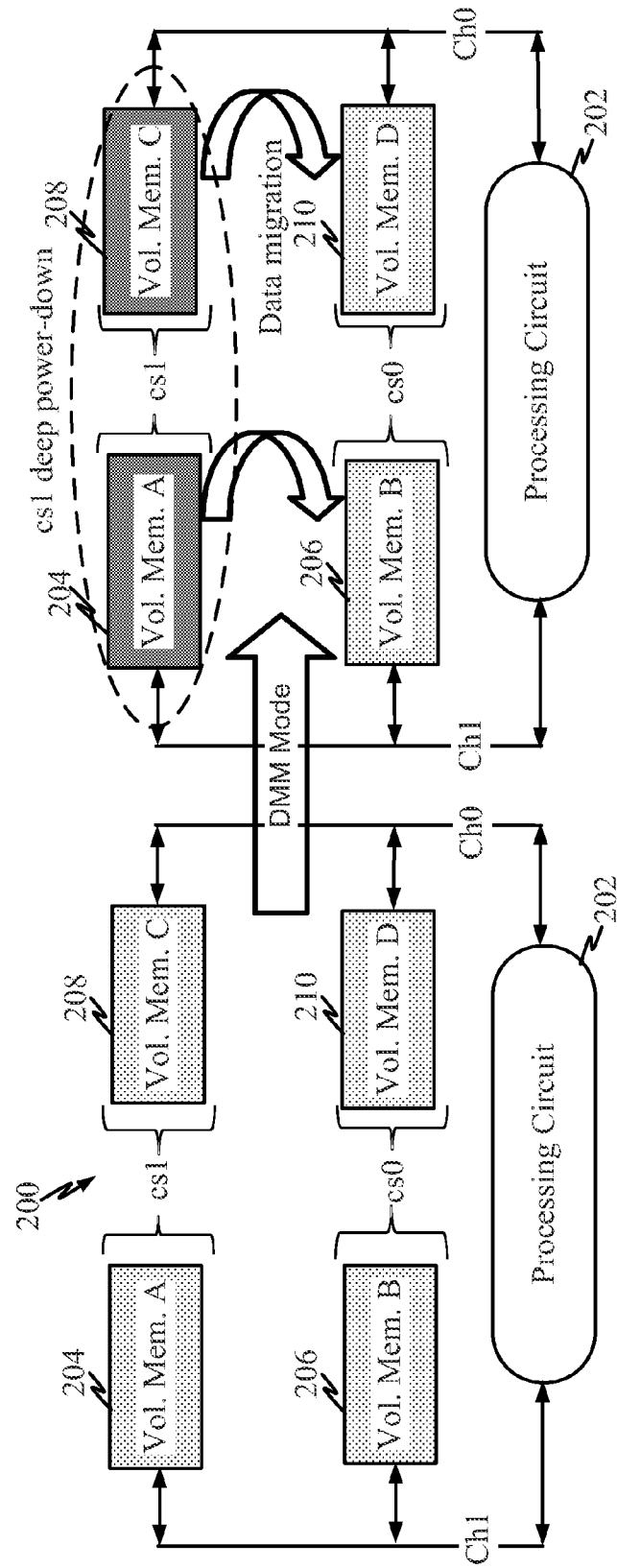
FIG. 2 illustrates a traditional dynamic memory management (DMM) scheme.
Figure 3:
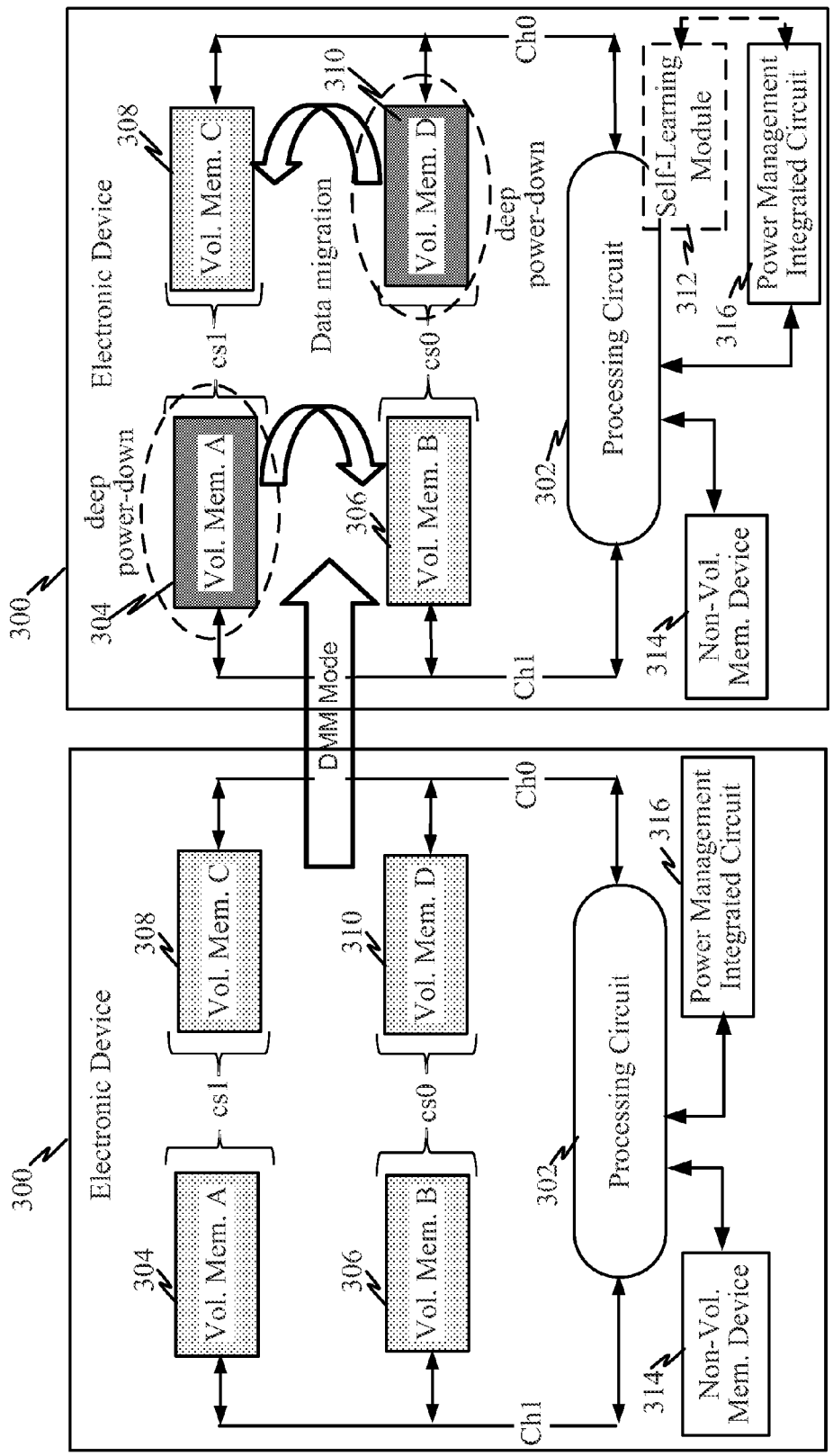
FIG. 3 illustrates a first enhanced dynamic memory management technique in which the overall low-power state current/power consumption of each memory device is considered in determining which memory device(s) will be powered-down and which memory devices may be placed in a power conservation state (e.g., self-refresh state).

First Exemplary Enhanced Dynamic Memory Management Technique Based on Memory Device Current/Power Consumption FIG. 3 illustrates a first enhanced dynamic memory management technique in which the overall low-power state current/power consumption of each memory device is considered in determining which memory device(s) will be powered-down and which memory devices may be placed in a power conservation state (e.g., self-refresh state). Note that such power conservation state (e.g., self-refresh state) may use sufficient power to maintain (e.g., keep stored) the data in such memory devices. By contrast, the power-down state (e.g., power-off state) may cause data stored in such memory devices to be lost. In this example, an electronic device 300 (e.g., desktop and/or laptop computer, wireless phone, mobile phone, smart phone, digital assistant, digital music player, digital tablet, personal digital assistant, memory module, memory subsystem, memory package-on-package device, etc.) may include a processing circuit 302 (e.g., an application processor) and one or more memory devices 304, 306, 308, and 310. The memory devices 304, 306, 308, and 310 may be coupled to a memory bus through which they communicate with the processing circuit 302. The memory devices 304, 306, 308, and 310 may also be arranged in different channels (Ch0 and Ch1) within the memory bus, so that data can be routed to memory devices on a first channel (Ch0) or a second channel (Ch1). Each memory device 304, 306, 308, and 310 may be coupled to a chip select (cs) line so that individual memory devices coupled to a particular channel may be selected and/or deselected (e.g., so data can be written to or read from selected devices but not from deselected devices).

The processing circuit 302 may include a software and/or hardware module 312 that is adapted to conduct a self-learning process by which the current/power consumption characteristics are ascertained or otherwise obtained. For instance, in an "ascertaining" step, the processing circuit 302 and/or software/hardware module 312 may compute, determine, and/or estimate a leakage current/power characteristics and/or dynamic current/power characteristics using, for example, the method(s) described herein and/or illustrated in FIGS. 4, 6, 8 and then store such a leakage current/power characteristics and/or dynamic current/power characteristics in memory (e.g., volatile or non-volatile memory). In an "obtaining" step, the processing circuit 302 and/or software/hardware module 312 may merely read or retrieve the leakage current/power characteristics and/or dynamic current/power characteristics previously stored in memory (e.g., volatile or non-volatile memory), for instance, by the "ascertaining" step. In one example of ascertaining the leakage current/power characteristics and/or dynamic current/power characteristics, the processing circuit 302 may turn each memory device On and measures its memory power in a self-refresh mode (e.g., measure current/power consumed by each memory device while in self-refresh mode). This information may be recorded, for example, in a non-volatile memory device 314 (e.g., Electrically Erasable Programmable Read-Only Memory or EEPROM). In one example, a one-time test may be performed where memory device-to-device current/power consumption variation learning can be done in the factory at the end of production. Automation software/hardware embedded in the processing circuit 302 and/or a power management IC (PMIC) 316 may perform these functions of ascertaining the low-power state current/power consumption of each memory device 304, 306, 308, and 310. In yet other implementations, the low-power state current/power consumption characteristics for each memory device may be ascertained using an external testing device (e.g., during a manufacturing or testing stage) and then stored in the non-volatile memory device 314.

In one example, the low-power state current/power consumption may be ascertained by measuring the power of the memory devices when they are in a power conservation state, such as a "self-refresh" state. The power/current consumption of this low-power state may include both leakage current/power consumption (e.g., current that leaks from transistors in a memory device or cell) and/or dynamic power consumption (e.g., power consumed by a controller inside the memory device that periodically reads each memory address while the memory device is in a sleep mode most of the time). In one example, the low-power state may be a state in which a memory device can still retain data stored therein. By contrast, the power-down state (e.g., power-off state) may cause data stored in such memory device to be lost.

When the processing circuit 302 enters a first enhanced dynamic memory management mode, it migrates or moves data from volatile memory devices 304 and 310 having the highest/greatest low-power state current/power consumption to volatile memory devices 306 and 308 having the lowest/lower low-power state current/power consumption. After data has been migrated, the volatile memory devices 304 and 310 having the highest/higher current/power consumption may be turned Off or placed in a power-down (e.g., power-off) state. In this example, the lower low-power state current/power consumption volatile memory devices 308 and 306 are on different chip select lines. However, in various configurations, the lower current/power consumption volatile memory devices may both be coupled to the same chip select line (e.g., cs0 or cs1), or a combination of both chip select lines cs0 and cs1.

Figure 4:
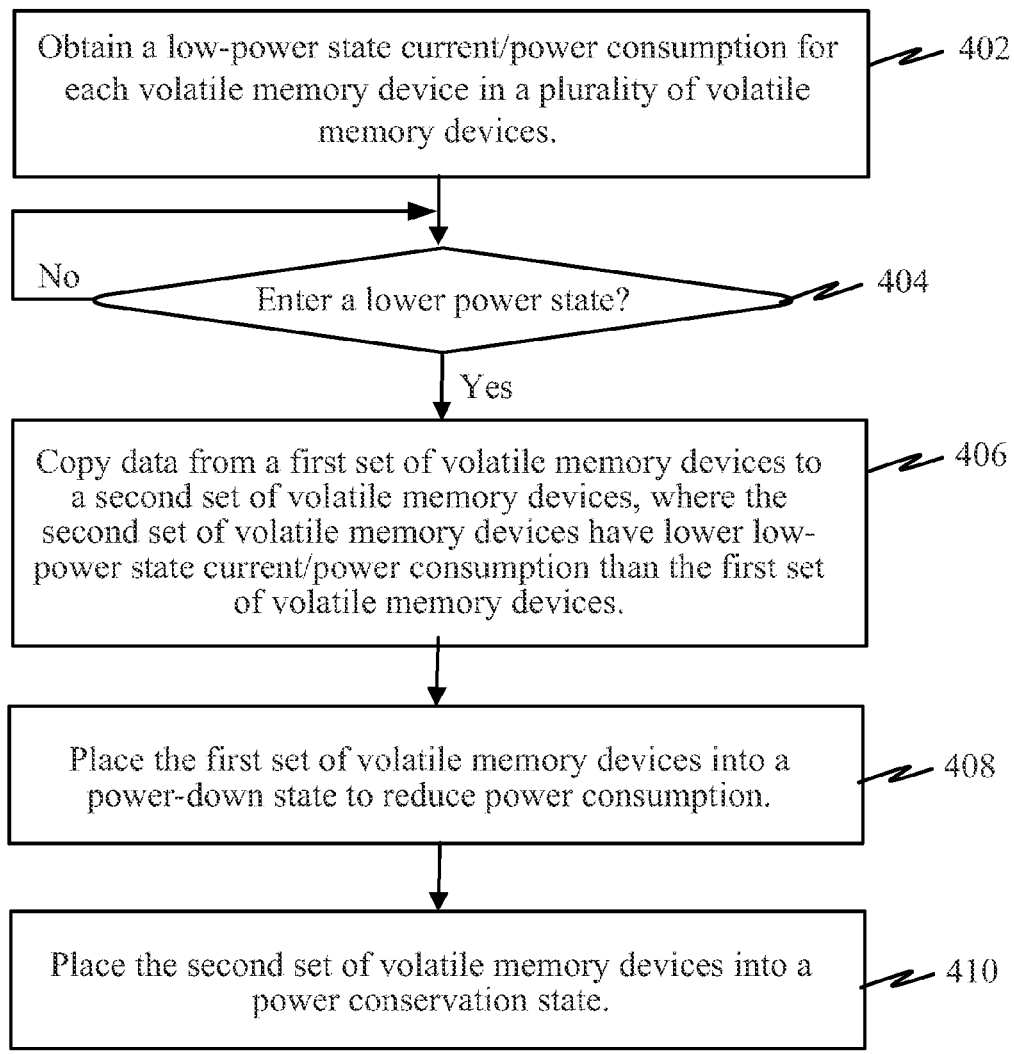
FIG. 4 illustrates a method implemented by a processing circuit to perform dynamic memory management (DMM) by selecting volatile memory devices with the lowest low-power state current/power consumption over volatile memory devices with the highest low-power state current/power consumption.

FIG. 4 illustrates a method implemented by a processing circuit to perform dynamic memory management (DMM) by selecting volatile memory devices with the lowest low-power state current/power consumption over volatile memory devices with the highest low-power state current/power consumption. A low-power state current/power consumption is obtained/ascertained for each volatile memory device in a plurality of volatile memory devices 402. This low-power state current/power consumption for each volatile memory device may be ascertained beforehand (e.g., at a manufacturing, testing, or power-up stage). The processing circuit may ascertain whether a lower power state should be entered (e.g., due to processor inactivity, etc.) 404. If so, the data is migrated/copied from a first set of volatile memory devices to a second set of volatile memory devices, where the second set of volatile memory devices has lower low-power state current/power consumption than the first set of volatile memory devices 406. That is, the individual volatile memory devices in the second set have been previously identified as having a lower low-power state current/power consumption than the individual volatile memory devices in the first set. The processing circuit may then place the first set of volatile memory devices into a power-down state (e.g., a powered off state) to reduce power consumption 408. The selection of volatile memory devices in the second set may be partially dependent on the memory structure being implemented. For example, where the volatile memory devices are arranged in dual channel architectures, at least one memory device from each channel may have to be selected. Consequently, the first set of volatile memory devices and second set of volatile memory devices may be selected from a plurality of memory devices on a per channel basis. For instance, for a first channel, the second set of memory devices have lower low-power state current/power consumption than the first set of memory devices, where all memory devices are coupled to the first channel. The second set of memory devices may also be placed into a power conservation state (e.g., a self-refresh mode) 410. Such power conservation state (e.g., self-refresh state) may use sufficient power to maintain (e.g., keep stored) the data in such second set of memory devices. By contrast, the power-down state may cause data stored in the first set of memory devices to be lost. Consequently, the power conservation state/mode may consume more power than the power-down state (e.g., the powered off state). In various implementations, the low-power state at which the current/power consumption for the memory devices is obtained may be the power conservation state or it may be a different power state.

Figure 5:
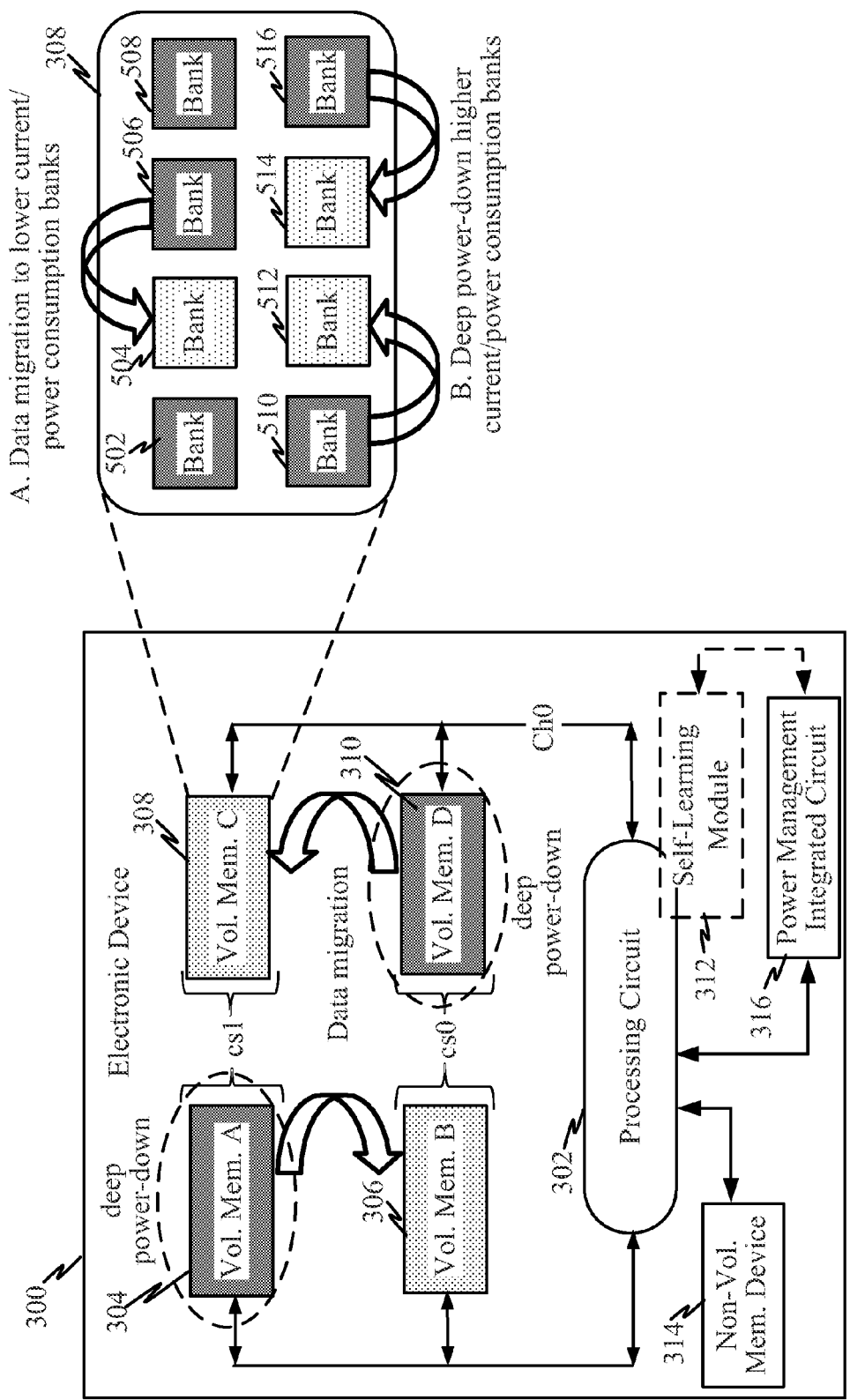
FIG. 5 illustrates a second enhanced dynamic memory management technique in which the low-power state current/power consumption of each bank of a memory device is considered in determining which memory banks will be powered-down and which memory banks may be placed into a power conservation state (e.g., self-refresh state).

Second Exemplary Enhanced Dynamic Memory Management Technique Based on Memory Bank Current/Power Consumption within a Memory Device FIG. 5 illustrates a second enhanced dynamic memory management technique in which the low-power state current/power consumption of each bank of a memory device is considered in determining which memory banks will be powered-down and which memory banks may be placed into a power conservation state (e.g., self-refresh state). Note that such power conservation state (e.g., self-refresh state) may use sufficient power to maintain (e.g., keep stored) the data in such memory banks. By contrast, the power-down state may cause data stored in such memory banks to be lost. The self-learning module 312 in the processing circuit 302 may conduct a self-learning process where it obtains a bank-to-bank low-power state current/power consumption ranking or profile for one or more memory devices as well as memory banks 502, 504, 506, 508, 510, 512, 514, and 516 within the one or more memory devices 304, 306, 308, and 310. When the processing circuit 302 initiates a second enhanced dynamic memory management mode, data is migrated/copied from higher current/power consumption memory devices to lower current/power consumption memory devices, and from higher current/power consumption memory banks to lower current/power consumption banks within the lower current/power consumption memory devices. For example, data from volatile memory devices A 304 and D 310 is migrated/moved to volatile memory devices B 306 and C 308, respectively, and volatile memory devices A 304 and D 310 may be powered Off or placed in a lowered power state. Then, within volatile memory devices B 306 and C 308, data from the higher current/power consumption banks 506, 510, and 516 is migrated/transferred to lower current/power consumption banks 504, 512, and 514, respectively. The higher current/power consumption memory banks may then be turned off to conserve power. For instance, the higher current/power consumption banks 506, 510, and 516 may then be powered Off or placed in a lowered power state. In one example, the self-refresh rate and/or voltage for the active/selected memory banks (e.g., lower current/power consumption memory banks) may be lowered because the minimum required self-refresh rate and/or voltage vary depending on the active memory banks. That is, turning off the higher current/power consumption memory banks 506, 510, and 516 permits increasing the self-refresh period and/or lowering the voltage on the active/selected memory banks 502, 504, 508, 512, and 514.

Figure 6:
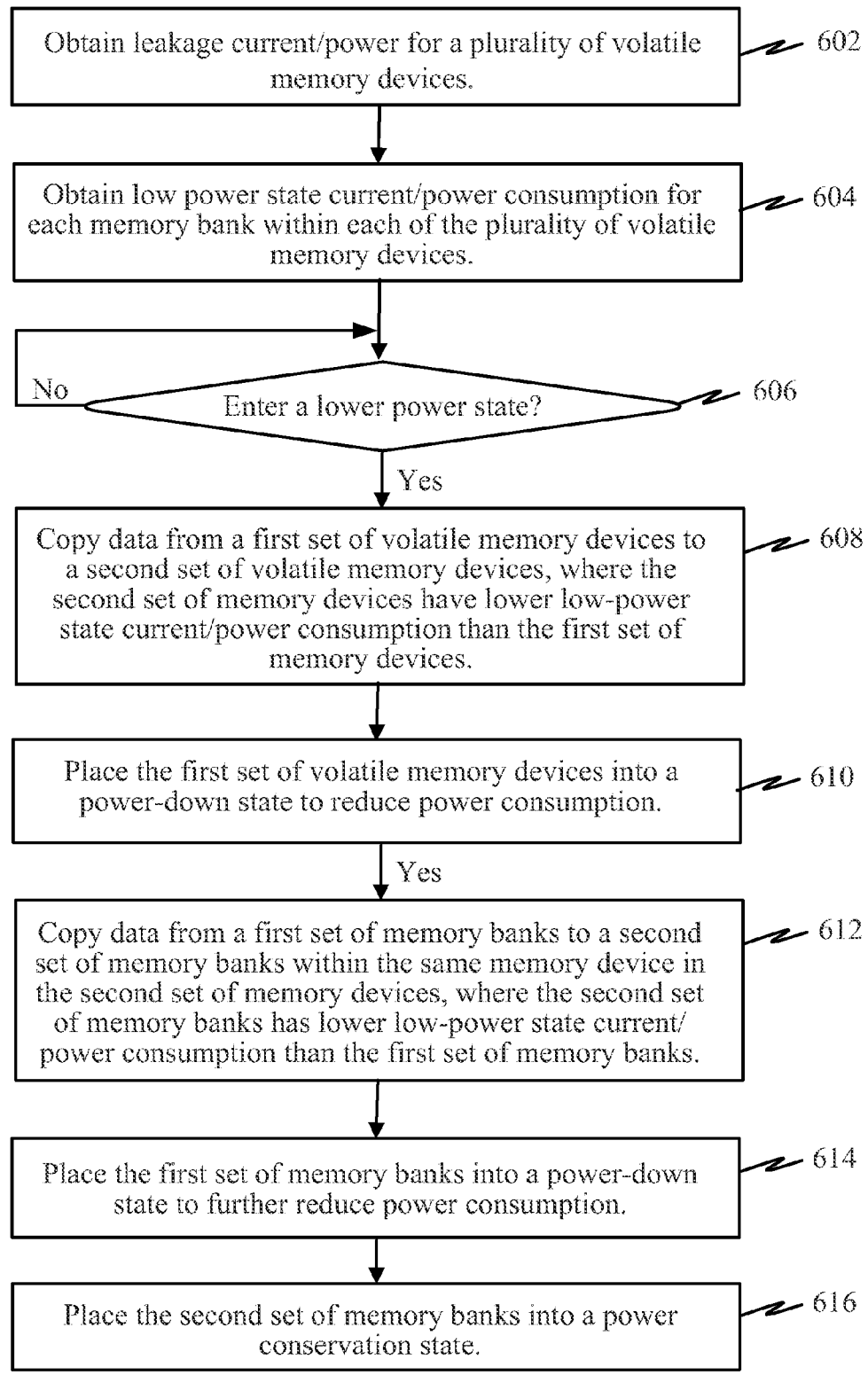
FIG. 6 illustrates a method implemented by a processing circuit to perform dynamic memory management (DMM) by selecting memory banks with the lowest low-power state current/power consumption.

FIG. 6 illustrates a method implemented by a processing circuit to perform dynamic memory management (DMM) by selecting memory banks with the lowest low-power state current/power consumption. Similar to the method in FIG. 4, this method ascertains and selects the memory devices with the lowest low-power state current/power consumption. A low-power state current/power consumption is obtained/ascertained for a plurality of volatile memory devices 602. Additionally, the low-power state current/power consumption for each memory bank within each of the memory devices is also obtained/ascertained 604. This low-power state current/power consumption for each volatile memory device may be ascertained beforehand (e.g., at a manufacturing, testing, or power-up stage). In some implementations, a power management circuit within the processing circuit may perform the steps of obtaining/ascertaining the current and/or power consumption information for the memory devices. Additionally, such low-power state current/power consumption information may have been previously stored in a non-volatile storage device coupled to the processing circuit.

The processing circuit may ascertain whether a lower power state should be entered (e.g., due to processor inactivity, etc.) 606. If so, the data is migrated/copied from a first set of volatile memory devices to a second set of volatile memory devices, where the second set of volatile memory devices has lower low-power state current/power consumption than the first set of volatile memory devices 608. That is, the individual volatile memory devices in the second set have been previously identified as having a lower low-power state current/power consumption than the individual volatile memory devices in the first set. The processing circuit may then place the first set of volatile memory devices into a power-down state (e.g., a lowered power state or powered off state) to reduce power consumption 610.

Once data has been migrated to the lowest low-power state current/power consumption memory devices, data is copied/migrated from a first set of memory banks to a second set of memory banks within the same memory device, where the second set of memory banks has lower low-power state current/power consumption than the first set of memory banks 612. The first set of memory banks may then be placed into a power-down (e.g., power-off) state to further reduce power consumption 614 (e.g., a deep power-down state).

In some implementations, once the lowest power consumption memory devices have been identified, only the bank power consumption for those lowest power consumption memory devices may be measured, estimated, or ascertained. That is, the power consumption for banks in memory devices that will be powered-down (turned off) need not be measured, estimated, or ascertained.

Additionally, according to another aspect, when data is copied or transferred from a volatile memory device that is to be powered-down into a volatile memory device that is to be put into a power conservation state (e.g., a self-refresh where data is maintained), the data may be transferred directly into the lowest power banks rather than copying into the lowest power device and then moving from the higher power banks to the lower power banks.

The second set of memory devices may be placed into a power conservation state (e.g., a self-refresh mode) 616. Such power conservation state (e.g., self-refresh state) may use sufficient power to maintain (e.g., keep stored) the data in such second set of memory banks. By contrast, the power-down state may cause data stored in the first set of memory banks to be lost. Consequently, the power conservation state/mode may consume more power than the power-down state (e.g., the powered off state).

Considerations for Ascertaining Memory Device/Bank Current/Power Consumption

Figure 7:
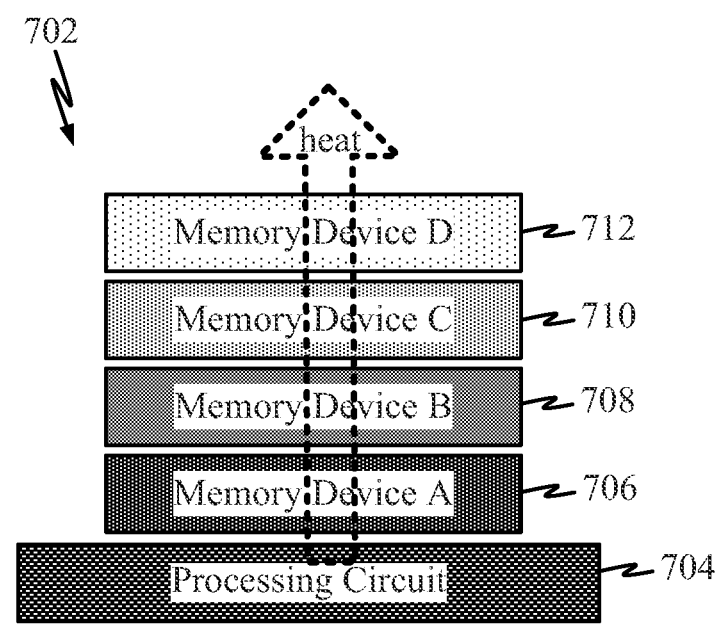
FIG. 7 illustrates that heat distribution may be considered in gauging low-power state current/power consumption for memory devices and/or banks.

FIG. 7 illustrates that heat distribution may be considered in gauging low-power state current/power consumption for memory devices and/or banks. Some memory devices may include one or more temperature sensors, allowing a processing circuit to ascertain their temperature (e.g., throughout a package-on-package stack of memory devices).

In this example, an electronic device 702 may include a processing circuit 704 on which a plurality of memory devices 706, 708, 710, and 712 are stacked. Temperature monitoring may be used to make sure that comparisons of power consumption of memory devices are performed at the same temperature point. As illustrated, heat from the processing circuit 704 may be distributed across the different memory devices 706, 708, 710, 712 at different rates, thereby creating temperature differences and potentially affecting the power consumption of the devices. For instance, memory device A 706 which is closest to the processing circuit 704 may get hotter than memory device D 712 which is farthest from the processing circuit 704. So, one aspect may seek to ascertain the low-power state current/power consumption for each memory device 706, 708, 710, and 712 at approximately the same temperature. In another feature, the temperature at which the low-power state current/power consumption for each memory device 706, 708, 710, and 712 may be recorded and then the low-power state current/power consumption of each memory device 706, 708, 710, and 712 may be normalized for temperature prior to determining which memory device(s) have the lowest low-power state current/power consumption.

Figure 8:
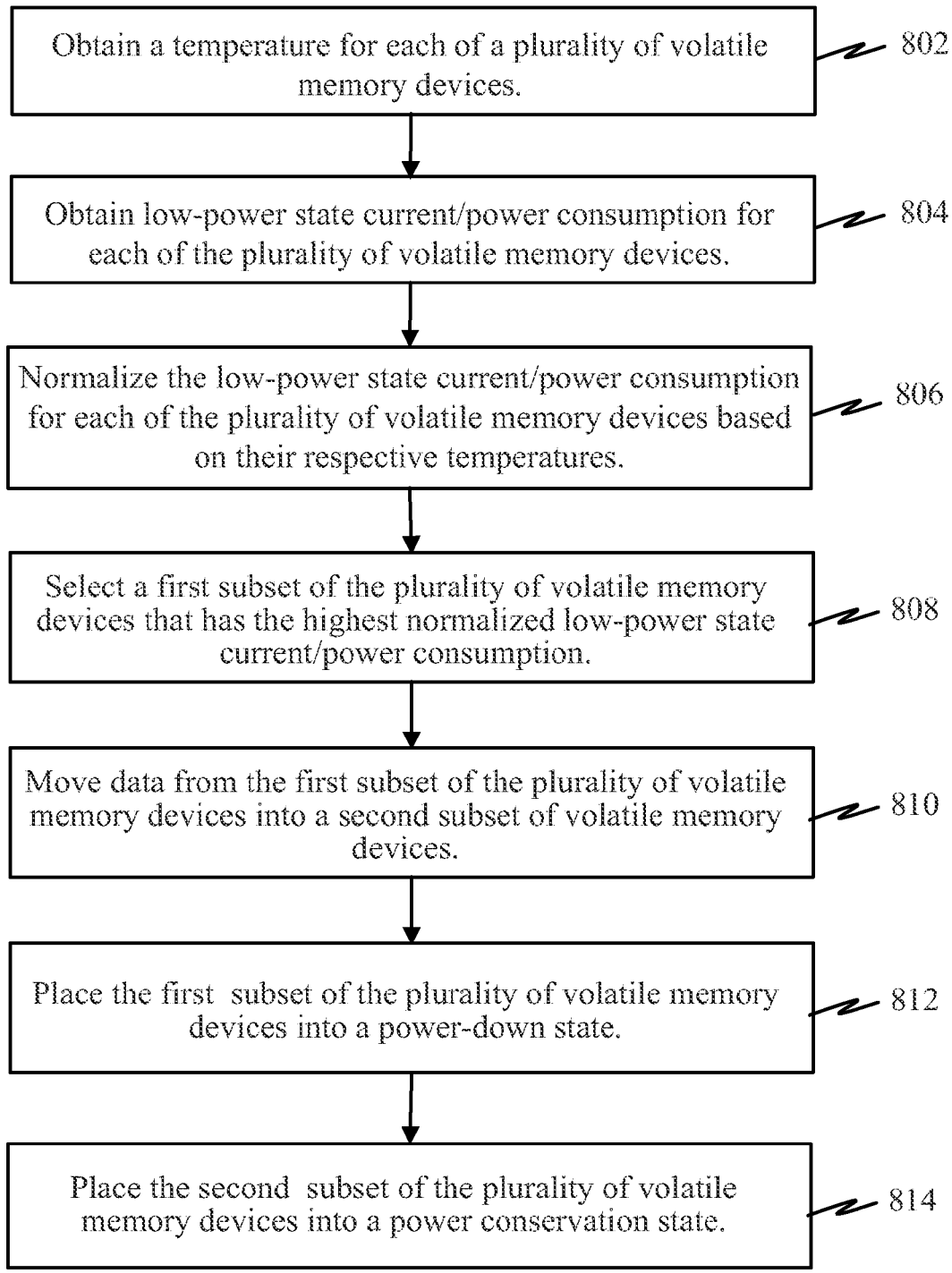
FIG. 8 illustrates an example of how low-power state current/power consumption for each memory device and/or memory bank within each memory device may be ascertained.

FIG. 8 illustrates a method operational in a processing circuit for ascertaining a low-power state current/power consumption for a plurality of memory devices of varying temperatures. A temperature may be obtained/ascertained for each of a plurality of volatile memory devices 802. A low-power state current/power consumption (e.g., leakage current consumption and/or dynamic power consumption) may be obtained/ascertained for each of the plurality of volatile memory devices 804. In some implementations, the low-power state current/power consumption and temperature may be obtained concurrently for each device. Thus, the temperature and low-power state current/power consumption may be obtained on a device by device basis.

The low-power state current/power consumption may be normalized for each of the plurality of volatile memory devices based on their respective temperatures 806. A first subset of the plurality of volatile memory devices may be selected that has the highest normalized low-power state current/power consumption 808. Data may then be moved, copied, and/or migrated from the first subset of the plurality of volatile memory devices into a second subset of volatile memory devices 810. The first subset of the plurality of volatile memory devices may then be placed into a power-down (e.g., power-off) state 812. Additionally, the second subset of the plurality of volatile memory devices may be placed into a power conservation state (e.g., self-refresh state). Such power conservation state (e.g., self-refresh state) may use sufficient power to maintain (e.g., keep stored) the data in such second set of memory banks. By contrast, the power-down state may cause data stored in the first set of memory banks to be lost. Consequently, the power conservation state/mode may consume more power than the power-down state (e.g., the powered off state). In some implementations, a power management circuit within the processing circuit may perform the steps of obtaining/ascertaining the current/power consumption information for the memory devices.

In an alternative implementation, the second subset of the plurality of volatile memory devices may be selected that has the lowest normalized low-power state current/power consumption. Data may then be moved, copied, and/or migrated from a first subset of the plurality of volatile memory devices into the second subset of volatile memory devices.

Figure 9:
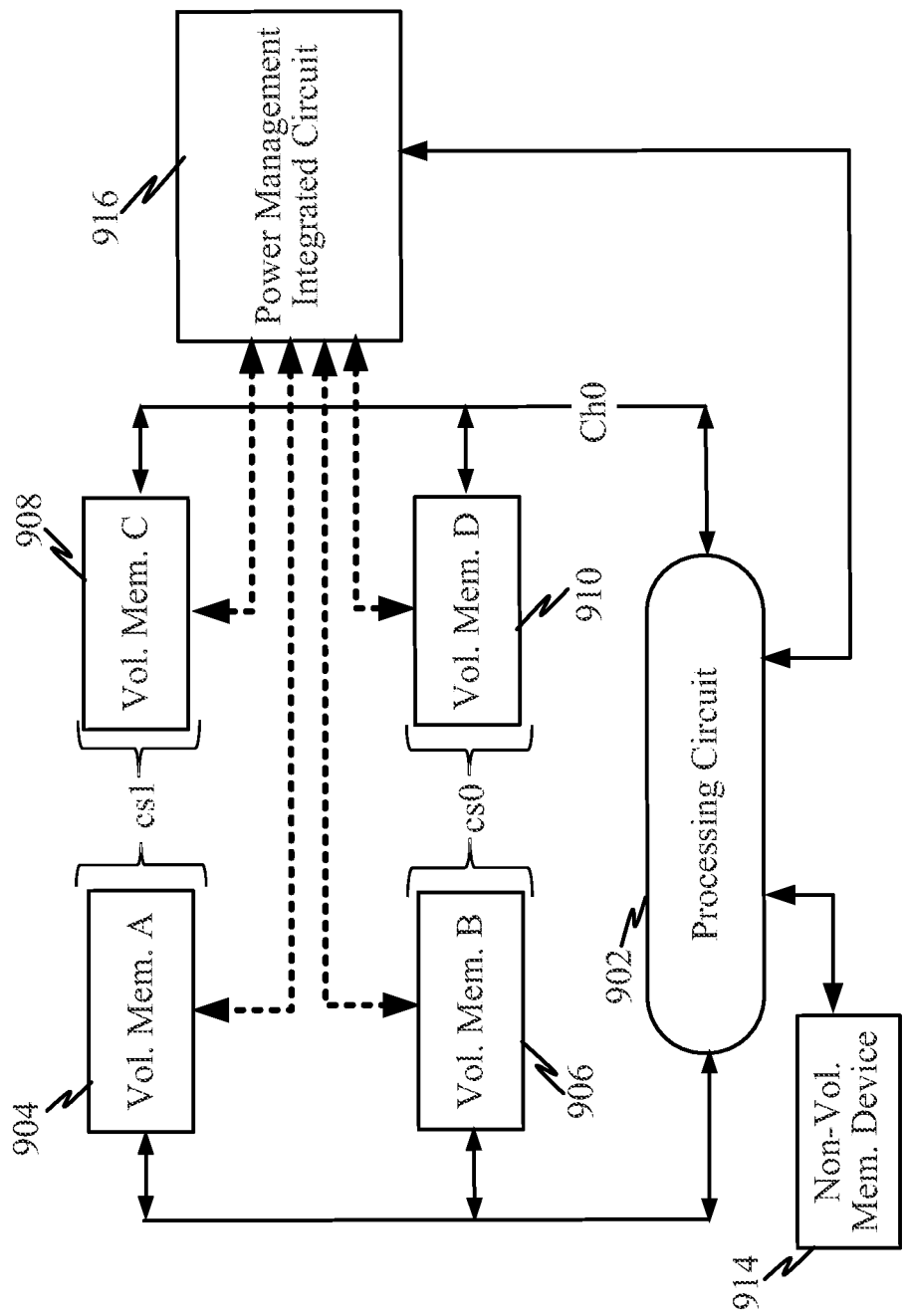
FIG. 9 illustrates an example of how low-power state current/power consumption for each memory device and/or memory bank within each memory device may be ascertained.

FIG. 9 illustrates an example of how low-power state current/power consumption for each memory device and/or memory bank within each memory device may be ascertained. During a self-learning process (e.g., during manufacturing, initialization or boot-up stage), a processing circuit 902 may turn On each memory device 904, 906, 908, and 910 (e.g., RAM x32) one at a time to evaluate the low-power state current/power consumption for that memory device. This low-power state current/power consumption may be ascertained in a number of ways. In a first example, a current sensing circuit that is part of a power management integrated circuit 916 (PMIC) may be used for this purpose. If this approach is used, the PMIC 916 and processing circuit 902 may communicate to report the memory device measurement results (e.g., low-power state current/power consumption characteristics) to the processing circuit 902. In a second example, an on-board sensing resistor may be used along with external probes/tools during a production process. If this approach is used, the external tool may send the memory device measurement results (e.g., low-power state current/power consumption characteristics) to the processing circuit 902 by an external connector or interface.

The processing circuit 902 may maintain a memory device low-power state current/power consumption comparison table in a non-volatile memory device 914 (e.g., EEPROM or non-volatile memory). In the case of dual channel memory architectures, the two lowest low-power state current/power consumption memory devices may be set as the default memory devices to be used to maintain the memory contents during dynamic memory management.

Where per-bank power gating is available (e.g., where individual memory banks can be powered-off), low-power state current/power consumption information may be similarly obtained for each memory bank during a self-learning process by turning on each bank one-by-one.

One or more of the components, steps, features and/or functions illustrated in the FIGS. may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. may be configured to perform one or more of the methods, features, or steps described in the FIGS. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An electronic device, comprising:
    a plurality of volatile memory devices; and
    a processing circuit coupled to the plurality of volatile memory devices, wherein the processing circuit is configured to perform dynamic memory management by
        obtaining a power conservation state current/power consumption for each volatile memory device in the plurality of volatile memory devices and determining between at least two sets of volatile memory devices of the plurality of volatile memory devices which set has a lower power conservation state current/power consumption, wherein the power conservation state current/power consumption includes dynamic power consumption;
        copying data from a first set of the volatile memory devices, during a transition to a power-down state, to a second set of the volatile memory devices to reduce current/power consumption based on a determination that the second set of volatile memory devices has a lower power conservation state current/power consumption than the first set of volatile memory devices;
        placing the first set of volatile memory devices into the power-down state to reduce power consumption, and
        placing the second set of volatile memory devices into the power conservation state to reduce power consumption, wherein the power conservation state maintains data in the second set of volatile memory devices, while the power-down state causes data in the first set of volatile memory devices to be lost.

2. The device of claim 1, wherein the processing circuit is further configured to:
    determine when to switch the first set of volatile memory devices into the power-down state after a period of inactivity.

3. The device of claim 1, wherein the power conservation state current/power consumption further includes leakage current/power consumption.

4. The device of claim 1, wherein the plurality of volatile memory devices are arranged in one or more channels, and the first set and second set of volatile memory devices are determined on a per channel basis.

5. The device of claim 4, wherein the data is copied between memory devices in the same channel.

6. The device of claim 1, wherein the power conservation state current/power consumption for each of the plurality of volatile memory devices is ascertained during a manufacturing stage or during an initialization stage.

7. The device of claim 1, further comprising:
    a power management device coupled to the processing circuit and configured to ascertain the power conservation state current/power consumption for each of the plurality of volatile memory devices.

8. The device of claim 1, wherein the processing circuit is further configured to
    compensate for temperature variations between the memory devices; and
    normalize the power conservation state current/power consumption for each of the plurality of volatile memory devices based on their corresponding temperatures.

9. The device of claim 1, further comprising:
    a non-volatile storage device coupled to the processing circuit, the non-volatile storage device storing the power conservation state current/power consumption for each of the plurality of volatile memory devices.

10. The device of claim 1, wherein the processing circuit is further configured to perform dynamic memory management by obtaining a power conservation state current/power consumption for each memory bank within each of the volatile memory devices of the plurality of volatile memory devices;

copying data from a first set of memory banks to a second set of memory banks within the same memory device of the second set of memory, where the second set of memory banks has lower power conservation state current/power consumption than the first set of memory banks; and placing the first set of memory banks into the power-down state.

11. A method for performing dynamic memory management, comprising:

obtaining a power conservation state current/power consumption for each volatile memory device in a plurality of volatile memory devices and determining between at least two sets of volatile memory devices of the plurality of volatile memory devices which set has a lower power conservation state current/power consumption, wherein the power conservation state current/power consumption includes dynamic power consumption;

copying data from a first set of the volatile memory devices to a second set of the volatile memory devices, during a transition to a power-down state, to reduce current/power consumption based on a determination that the second set of volatile memory devices has a lower power conservation state current/power consumption than the first set of volatile memory devices;

placing the first set of volatile memory devices into the power-down state to reduce power consumption, and placing the second set of volatile memory devices into the power conservation state to reduce power consumption, wherein the power conservation state maintains data in the second set of volatile memory devices, while the power-down state causes data in the first set of volatile memory devices to be lost.

12. The method of claim 11, further comprising:
determining when to switch the first set of volatile memory devices into the power-down state after a period of inactivity.

13. The method of claim 11, wherein the power conservation state current/power consumption further includes leakage current/power consumption.

14. The method of claim 11, further comprising:
compensating for temperature variations between the memory devices; and
normalizing the power conservation state current/power consumption for each of the plurality of volatile memory devices based on their corresponding temperatures.

15. The method of claim 11, wherein the first set of the volatile memory devices and the second set of the volatile memory devices are coupled to the same memory bus channel.

16. The method of claim 11, further comprising:
obtaining a power conservation state current/power consumption for each memory bank within each of the plurality of volatile memory devices;
copying data from a first set of memory banks to a second set of memory banks within the same memory device in the second set of memory devices, where the second set of memory banks has lower power conservation state current/power consumption than the first set of memory banks; and
placing the first set of memory banks into the power-down state.

* * * * *